US010169730B2

(12) United States Patent
Volchegursky et al.

(10) Patent No.: US 10,169,730 B2
(45) Date of Patent: *Jan. 1, 2019

(54) SYSTEM AND METHOD TO PRESENT A SUMMARIZED TASK VIEW IN A CASE MANAGEMENT SYSTEM

(71) Applicant: Open Text Corporation, Waterloo (CA)

(72) Inventors: Dmitry Volchegursky, Livermore, CA (US); Boris Shpilyuck, Ashdod (IL); Dmitry Korshunov, Pleasanton, CA (US); Shu-Shang Sam Wei, Danville, CA (US)

(73) Assignee: Open Text Corporation, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/476,443

(22) Filed: Mar. 31, 2017

(65) Prior Publication Data

US 2017/0270439 A1   Sep. 21, 2017

Related U.S. Application Data

(63) Continuation of application No. 14/320,213, filed on Jun. 30, 2014, now Pat. No. 9,646,081.

(51) Int. Cl.
*G06F 17/30* (2006.01)
*G06Q 10/06* (2012.01)

(52) U.S. Cl.
CPC ... *G06Q 10/0633* (2013.01); *G06F 17/30011* (2013.01)

(58) Field of Classification Search
CPC ......... G06F 17/30011; G06F 17/30165; G06F 11/3089; G06F 17/30; G06F 17/30321;
(Continued)

(56) References Cited

U.S. PATENT DOCUMENTS 5,295,065 A   3/1994   Chapman
5,838,968 A   11/1998   Dulbert
(Continued)

OTHER PUBLICATIONS

Office Action for U.S. Appl. No. 14/320,213, dated Jun. 17, 2016, 16 pgs.
(Continued)

*Primary Examiner* — Anh Ly
(74) *Attorney, Agent, or Firm* — Sprinkle IP Law Group

(57) ABSTRACT

A system and method is illustrated for providing information related to a task in a case management system configured to process a plurality of cases. The system and method includes identifying among the plurality of cases case clusters, for a case cluster of the case clusters, identifying task clusters, wherein each of task cluster is associated with a task similarity factor shared by at least two tasks of the task cluster, and tasks of the task clusters are performed on cases of the case cluster, analyzing reports and documents used to perform the at least two tasks of the task cluster sharing the task similarity factor, and when performing a task sharing the task similarity factor with the at least two tasks, providing at least one report based on the reports and at least one summary based on the documents.

20 Claims, 7 Drawing Sheets

(58) Field of Classification Search
CPC ............ G06F 17/30613; G06F 3/0488; G06F 3/04883; G06F 3/0482; G06F 17/30554; G06F 19/3406; G06F 3/04842; H04L 63/1433; H04L 63/1408; G06Q 10/0633; G06Q 10/06

See application file for complete search history.

(56) References Cited

U.S. PATENT DOCUMENTS

| | | | |
|---|---|---|---|
| 5,872,850 A * | 2/1999 | Klein | G06F 17/3061 705/51 |
| 6,092,049 A * | 7/2000 | Chislenko | G06F 17/30699 705/7.29 |
| 6,098,070 A | 8/2000 | Maxwell | |
| 6,112,186 A * | 8/2000 | Bergh | G06F 17/30699 705/14.37 |
| 6,832,199 B1 | 12/2004 | Kucek | |
| 7,334,229 B1 | 2/2008 | McDonald | |
| 7,966,369 B1 | 6/2011 | Briere | |
| 8,185,560 B2 * | 5/2012 | Arumainayagam | G06Q 10/10 707/769 |
| 9,224,132 B1 | 12/2015 | Knox | |
| 9,646,081 B1 | 5/2017 | Volchegursky et al. | |
| 2001/0047326 A1 | 11/2001 | Broadbent et al. | |
| 2002/0107914 A1 | 8/2002 | Charisius | |
| 2003/0144892 A1 | 7/2003 | Cowan | |
| 2003/0220823 A1 | 11/2003 | Sartorius | |
| 2003/0236679 A1 | 12/2003 | Galves | |
| 2004/0143450 A1 | 7/2004 | Vidali | |
| 2005/0028073 A1 | 2/2005 | Henry et al. | |
| 2005/0182773 A1 | 8/2005 | Feinsmith | |
| 2005/0209987 A1 | 9/2005 | Beres et al. | |
| 2006/0069605 A1 | 3/2006 | Hatoun | |
| 2006/0195420 A1 * | 8/2006 | Kilroy | G06F 17/30401 707/E17.032 |
| 2006/0294002 A1 | 12/2006 | Brett | |
| 2007/0067772 A1 | 3/2007 | Bustamante | |
| 2007/0143764 A1 | 6/2007 | Kern et al. | |
| 2007/0150327 A1 | 6/2007 | Dromgold | |
| 2007/0174342 A1 | 7/2007 | Maeda | |
| 2007/0233709 A1 | 10/2007 | Abnous | |
| 2007/0239504 A1 | 10/2007 | Austin et al. | |
| 2007/0299859 A1 | 12/2007 | Gupta | |
| 2008/0071600 A1 | 3/2008 | Johnson | |
| 2008/0147443 A1 | 6/2008 | Scherpbier | |
| 2008/0212845 A1 | 9/2008 | Lund | |
| 2009/0063413 A1 | 3/2009 | Lee | |
| 2009/0083058 A1 | 3/2009 | Beringer et al. | |
| 2009/0171884 A1 * | 7/2009 | Wright | G06F 17/30011 707/E17.005 |
| 2009/0171897 A1 | 7/2009 | Spinola et al. | |
| 2009/0299811 A1 | 12/2009 | Verfuerth | |
| 2010/0121859 A1 | 5/2010 | Maeda et al. | |
| 2010/0146015 A1 | 6/2010 | Milic-Frayling et al. | |
| 2010/0250455 A1 * | 9/2010 | Richards | G06Q 10/10 705/311 |
| 2010/0262653 A1 | 10/2010 | Chaffee | |
| 2010/0280985 A1 | 11/2010 | Duchon | |
| 2010/0293182 A1 | 11/2010 | Karhinen et al. | |
| 2010/0324927 A1 * | 12/2010 | Tinsley | G06F 19/322 705/2 |
| 2011/0093538 A1 | 4/2011 | Weir et al. | |
| 2011/0093854 A1 * | 4/2011 | Blanc | G06F 9/5066 718/101 |
| 2011/0125679 A1 | 5/2011 | Brdiczka | |
| 2011/0231414 A1 | 9/2011 | Goodwin | |
| 2012/0089640 A1 * | 4/2012 | Arumainayagam | G06F 17/30011 707/770 |
| 2012/0150859 A1 | 6/2012 | Hu | |
| 2012/0166206 A1 * | 6/2012 | Feely | G06Q 10/10 705/1.1 |
| 2013/0111480 A1 | 5/2013 | Cox et al. | |
| 2013/0198193 A1 | 8/2013 | Chitiveli | |

OTHER PUBLICATIONS

Notice of Allowance for U.S. Appl. No. 14/320,213, dated Jun. 17, 2016, 7 pgs.

Perner, Petra, "Are case-based reasoning and dissimilarity-based classification two sides of the same coin?", Machine-Learning and Data Mining MLDM in Pattern Recognition, Engineering Applications of Artificial Intelligence, vol. 15, Issue 2, Apr. 2002, pp. 193-203.

Kanthale, Parag M. et al, "Cavity cluster approach for quantification of cavitational intensity in sonochemical reactors," Selected Papers from the Eighth Conference of the European Society of Sonochemistry Ultrasonics Sonochemistry, vol. 10, Issues 4-5, Jul. 2003, pp. 181-189.

Office Action for U.S. Appl. No. 13/433,499, dated Jan. 2, 2013, 32 pgs.

Office Action for U.S. Appl. No. 13/433,499, dated Jun. 5, 2013, 38 pgs.

Office Action for U.S. Appl. No. 13/433,499, dated Oct. 24, 2014, 38 pgs.

Office Action for U.S. Appl. No. 13/433,499, dated Apr. 6, 2015, 48 pgs.

Office Action for U.S. Appl. No. 13/433,499, dated Nov. 5, 2015, 58 pgs.

Office Action for U.S. Appl. No. 13/433,499, dated Mar. 10, 2016, 53 pgs.

Office Action for U.S. Appl. No. 13/433,499, dated Aug. 11, 2016, 52 pgs.

Office Action for U.S. Appl. No. 13/433,499, dated Mar. 3, 2017, 59 pgs.

Office Action for U.S. Appl. No. 13/433,499, dated Sep. 19, 2017, 56 pgs.

Office Action issued for U.S. Appl. No. 13/433,499, dated Apr. 19, 2018, 60 pgs.

* cited by examiner

SYSTEM AND METHOD TO PRESENT A SUMMARIZED TASK VIEW IN A CASE MANAGEMENT SYSTEM

CROSS-REFERENCE TO RELATED APPLICATION

This application is a continuation of, and claims a benefit of priority under 35 U.S.C. 120 of the filing date of U.S. patent application Ser. No. 14/320,213, now U.S. Pat. No. 9,646,081, filed Jun. 30, 2014, "SYSTEM AND METHOD TO PRESENT A SUMMARIZED TASK VIEW IN A CASE MANAGEMENT SYSTEM", the entire contents of which are hereby expressly incorporated by reference for all purposes.

BACKGROUND

Skilled knowledge workers are valuable resources to any enterprise. When these skilled workers are paid a fixed salary, an enterprise is motivated to optimize worker productivity by ensuring that each worker can perform his tasks accurately and efficiently. By reducing the time that each knowledge worker spends on each assigned task, more tasks can be completed and the enterprise can be more efficient and cost effective.

Oftentimes, when a knowledge worker is assigned a task, he is generally required to make a decision, such as, for example:

Should this insurance claim be approved?
Should this loan be approved with these particular terms?
Does this case require additional investigation?

To make such a decision, the knowledge worker typically must refer to information that is not necessarily specific to a case. For example, in order to determine whether a loan should be approved in a certain region or industry, the worker can refer to an analysis of demographic information in the region, or a report indicating trends in the particular industry related to the loan. Utilizing such information helps the knowledge worker make better decisions that ultimately benefit the enterprise and/or the customers.

The information required to make these decisions, however, is not always obvious to the worker and, in many cases, is not explicitly included in the task. As a result, the knowledge worker can spend considerable time identifying and searching for the needed information or may fail to find it altogether.

BRIEF DESCRIPTION OF THE DRAWINGS

Some embodiments of the system and method are described, by way of example, with respect to the following figures.

DETAILED DESCRIPTION

Figure 1:
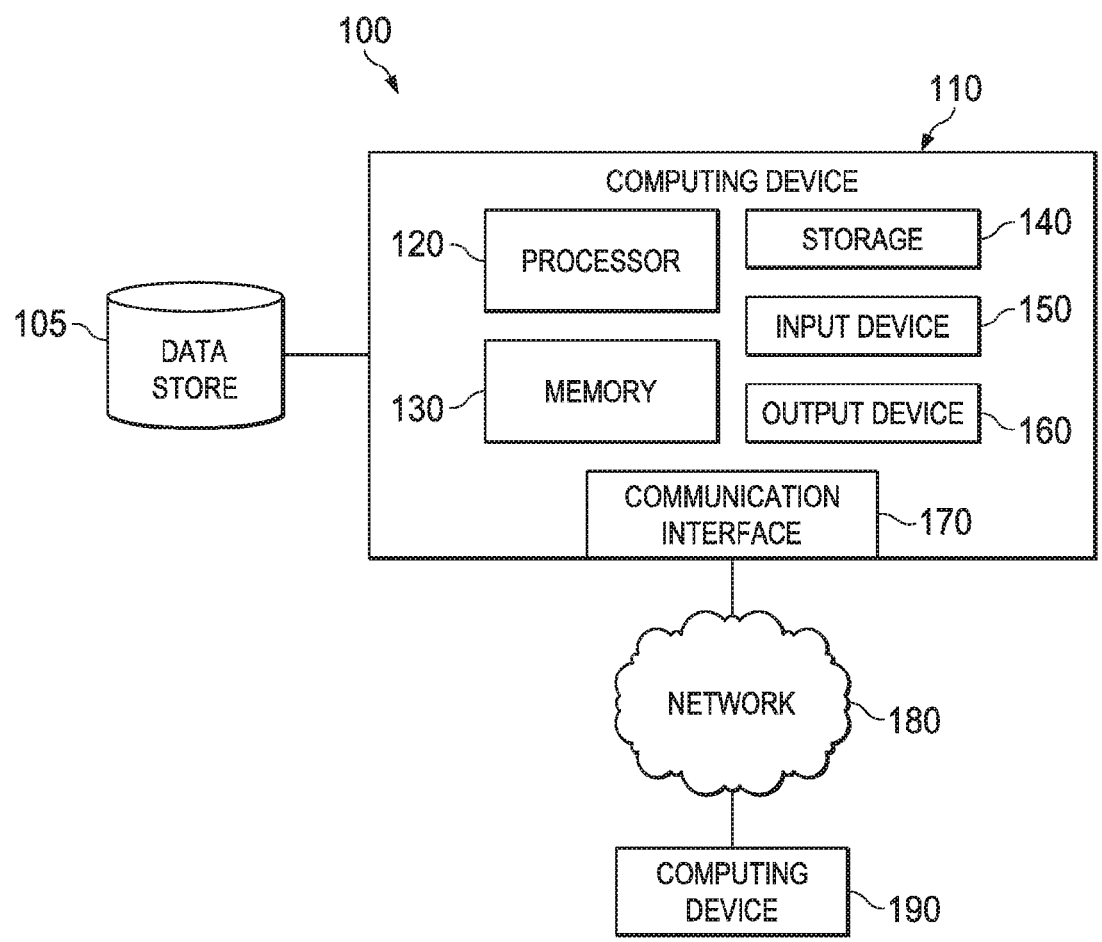
FIG. 1 is a block diagram illustrating an exemplary computing environment in which the subject matter may be implemented.

A detailed description of one or more example embodiments of a system and method is provided below along with accompanying figures. While this system and method is described in conjunction with such embodiment(s), it should be understood that the system and method is not limited to any one embodiment. On the contrary, the scope of the system and method is limited only by the claims and the system and method encompasses numerous alternatives, modifications, and equivalents. For the purpose of example, numerous specific details are set forth in the following description in order to provide a thorough understanding of the present system and method. These details are provided for the purpose of example, and the system and method may be practiced according to the claims without some or all of these specific details. For the purpose of clarity, technical material that is known in the technical fields related to the system and method has not been described in detail so that the present system and method is not unnecessarily obscured.

It should be appreciated that the present system and method may be implemented in numerous ways, including as a process, an apparatus, a device, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the system and method.

Applications may also be downloaded, in whole or in part, through the use of a software development kit or toolkit that enables the creation and implementation of the present system and method. In this specification, these implementations, or any other form that the system and method may take, may be referred to as techniques. In general, the order of the steps of disclosed processes may be altered within the scope of the system and method.

Techniques are described herein for presenting a summarized task view to knowledge workers in a case management system. The summarized task view may be automatically provided when tasks are assigned to the knowledge workers. The summarized task view may allow the knowledge workers to spend more time analyzing information pertinent to the task, and less time identifying and searching for, the information.

According to embodiments, a case management system is provided that allows an enterprise to manage its business processes and/or sales operations. For example, the case management system can manage an insurance claim process or a loan application process for a case, i.e., a specific insurance claim or a specific loan application, by breaking the process into several tasks that are then assigned to knowledge workers who are trained and/or qualified to complete the tasks for the case.

According to embodiments, when a knowledge worker is assigned on a task, the case management system can include a list manager component to provide a summarized task view. The summarized task view may include a list of resources, such as reports and summaries of documents. The reports and the summaries of documents may be generated based on the analysis of an activity monitor component. The activity monitor component may be configured to analyze reports and documents used to perform similar tasks.

In order to identify similar tasks, in embodiments, a case categorizer component may categorize a plurality of cases stored in the case management system into a plurality of case clusters. A task categorizer may then identify task clusters for cases in each case cluster and, in an embodiment, categorize those tasks into task clusters. Once the cases are categorized by case clusters, and the tasks of the cases are categorized by task clusters, the activity monitor may then monitor, in real time, which resources (e.g., reports, documents, etc.) the knowledge worker searches for and accesses, and may determine why the knowledge worker uses those resources to complete the task. The activity monitor component may monitor each knowledge worker's actions over a period of time and over a plurality of tasks, and may determine and store the resources used to complete the tasks for the plurality of cases.

According to embodiments, as the activity monitor component continuously monitors the system and generates analytic data, the list manager component can generate a resource list comprising reports, documents, and summaries of documents for each task cluster. The reports and the summaries of documents of the task cluster with which the assigned task is associated with may then be presented in the summarized task view to the knowledge worker. In the summarized task view, the knowledge worker may view reports that are requested most by other knowledge workers when performing similar tasks and view document summaries generated by the system based on documents requests by other knowledge workers when performing similar tasks. Upon viewing the summaries, the knowledge worker may also follow the links provided in the summarized task view to view full documents. Thus, when the summarized task view is automatically provided along with the assigned task, the knowledge worker can spend less time searching for relevant information to complete the task, thereby shortening the cycle time for the task and improving overall process efficiency.

FIG. 1 is an example system 100, in which a case management environment for providing a summarized task view to knowledge workers assigned to tasks may be implemented. The system 100 may include at least one computing device 110 operatively coupled to a data store 105 and communicatively coupled to at least one remote computing device 190 via network 180. Exemplary computing devices 110 and 190 may include physical or virtual desktop computers, servers, networking devices, notebook computers, PDAs, mobile phones, digital image capture devices, and the like. Through the computing devices 110 and 190, data may be generated and stored on the data store 105. The data store 105 may then provide data to the knowledge workers when the knowledge workers send data retrieval request to the computing device 110.

In embodiments, the data store 105 may include one or more storage devices. These devices may be, for example, devices that store data on one or more types of media, including magnetic, optical, or other type of media used for storing data. In this respect, it should be appreciated that data stored in the data store 105 may be stored on one or more physical devices in the data store 105. As further shown in FIG. 2 and FIG. 3, in embodiments, the data store 105 further includes a plurality data repositories for storing cases, work queues, and resources used in the case management system 100 for performing tasks in cases.

In embodiments, the computing device 110 includes at least one processor unit 120, memory 130, storage 140, input device(s) 150, and output device(s) 160. The processor 120 may be an instruction execution machine, apparatus, or device and may comprise a microprocessor, a digital signal processor, a graphics processing unit, an application specific integrated circuit (ASIC), a field programmable gate array (FPGA), etc. The processor unit 120 may be configured to execute program instructions stored in the memory 130 and/or the storage 140.

The memory 130 may be volatile (such as RAM, for example), non-volatile (such as ROM, flash memory, etc., for example) or some combination of the two. The memory 130 may be configured to store program instructions and data during operation of the computing device 110. In embodiments, the memory 130 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 130 may also include nonvolatile memory technologies such as nonvolatile flash RAM (NVRAM) or ROM. In embodiments, the memory 130 may include a combination of technologies such as the foregoing, as well as other technologies not specifically mentioned.

In embodiments, the computing device 110 includes at least one storage 140 (e.g., removable and/or non-removable). The storage 140 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD, or other optical media. The drives and their associated computer-readable media provide nonvolatile storage of computer readable instructions, data structures, program modules and other data for the computing device 110. In embodiments, computer readable instructions to implement embodiments provided herein may be stored in the storage 140. The storage 140 may also store other computer readable instructions to implement an operating system, an application program, program data, and the like. Computer readable instructions may be loaded in the memory 130 for execution by the processor 120, for example.

The computing device 110 may include input device(s) 150, such as at least one of a keyboard, mouse, pen, voice input device, touch input device, scanner, satellite dish, still camera, video input device, and/or any other input device. Output device(s) 160, such as one or more displays, speakers, printers, and/or any other output device may also be included in the computing device 110. Input device(s) 150 and output device(s) 160 may be operatively coupled to the computing device 110 via a wired connection, wireless connection, or any combination thereof. In embodiments, an input device or an output device from another computing device 190 may be operatively coupled to the computing device 110 and used as input device(s) 150 or output device(s) 160 for the computing device 110.

Components of the computing device 110 may be operatively coupled and connected by various interconnects, such as a bus. Such interconnects may include a Peripheral Component Interconnect (PCI), such as PCI Express, a USB, firewire, an optical bus structure, a local bus structure, and the like. In embodiments, components of the computing device 110 are interconnected by the network 180. For example, the memory 130 is comprised of multiple physical memory units located in different physical locations interconnected by the network 180.

Still referring to FIG. 1, the computing device 110 may also include at least one communication interface 170 to communicate with at least one remote computing device 190 via the network 180. The communication interface 170 may include, but not limited to, a modem, a Network Interface Card (NIC), an integrated network interface, a radio frequency transmitter/receiver, an infrared port, a Universal Serial Bus (USB) connection, a network processing unit, or other interfaces for connecting the computing device 110 to other computing devices 190. The connections to the network may include a wired connection or a wireless connection to transmit and/or receive data over communication media.

The remote computing device 190 may be another computer, a server, a router, a peer device or other common network node, and may include the components described above relative to the computing device 110. The communication interface 170 may interface with a wireless and/or a wired network 180. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In embodiments, communication interface 170 may include logic configured to support direct memory access (DMA) transfers between the memory 130 and other devices in the system 100.

The network 180 may provide connectivity among various components of the system 100 and may be implemented using the protocols such as TCP/IP, or some other logical or physical connection. In embodiments, the network 180 is implemented to provide support for various storage architectures such as Storage Area Network (SAN), Network-Attached Storage (NAS), Direct-Attached Storage (DAS), etc. Networks used to transfer data between the computing devices 110 and 190 and the data store 105 may include Fibre Channel, SCSI, Ethernet, Gigabit Ethernet, and other types of communication networks. The support for various storage architectures may be used to provide the connection between the computing devices 110 and 190 and the data store 105.

Those skilled in the art will realize that storage devices utilized to store computer readable instructions may be distributed across the system 100. For example, a remote computing device 190 accessible via the network 180 may store computer readable instructions to implement embodiments provided herein. The computing device 110 may access the remote computing device 190 and download the computer readable instructions for execution. Alternatively, the computing device 110 may download the computer readable instructions, as needed, or some instructions may be executed at the computing device 110 and some at the remote computing device 190.

It should be understood that the arrangement of system 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the computing device 110. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that variation of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 2:
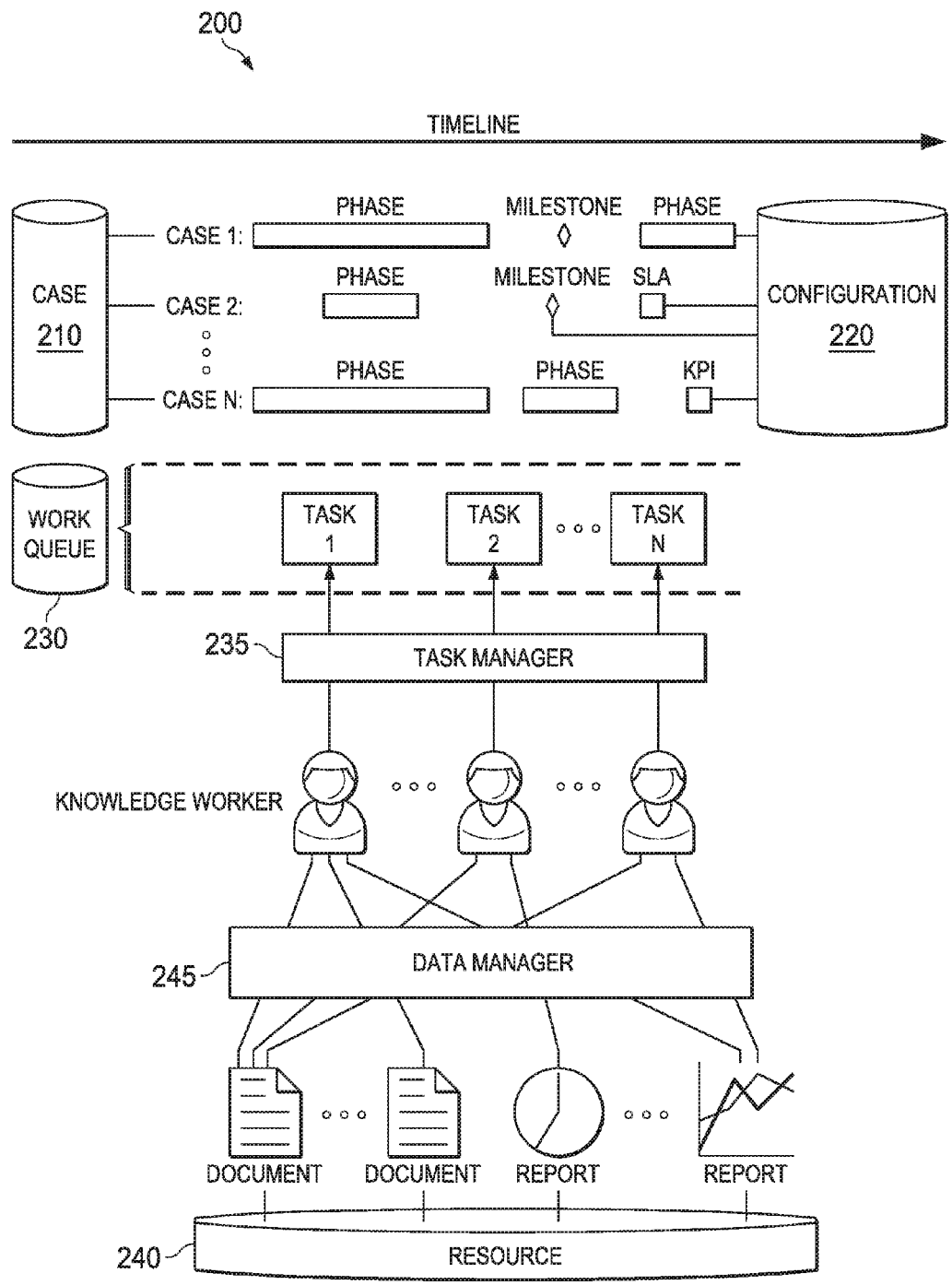
FIG. 2 is a diagram of an exemplary case management system illustrating task performance by knowledge workers in the case management system.

Referring now to FIG. 2, FIG. 2 is a diagram of an exemplary case management system 200 illustrating task performance by knowledge workers in the case management system 200. The arrangement of components in FIG. 2 may be implemented by components of the exemplary system 100 of FIG. 1. The exemplary case management system 200 for a processing a case may collect management data and/or case metadata for cases during a case management process. Exemplary business processes include insurance claim processes, loan application processes, and the like.

The case management system 200 may include the data store 105, such as a database, configured to store information that may be used for processing cases. The data store 105 may include various data repositories, such as a case repository 210 for storing cases and case metadata, a work queue repository 230 for storing tasks in work queues and task metadata, a configuration repository 220 for storing configurations of tasks, cases, and processes, and a resource repository 240 for storing resources, among others. According to embodiments, the resources stored in the resource repository 240 may include documents, files, reports, forms, and links to websites and webpages that may include helpful information.

When the case management system 200 is initially provided, configuration information of cases may be received, e.g., from a case management administrator, and stored in the configuration repository 220. In embodiments, the configuration information may define a plurality of phases in case management processes. For example, for an insurance claim case process, phases can include a claim intake phase, an investigation phase, a liability determination phase, and a valuation phase. In embodiments, each phase may be associated with a set of tasks that need to be completed by a knowledge worker in order for a case to progress through the case management process.

In addition, as shown in FIG. 2, the configuration information stored in the configuration repository 220 may define case attributes that may be standard attributes, e.g., along the timeline, a process/phase start and end date, or case specific attributes depending on a type of process being managed. For example, when the case management system 200 manages a bank loan application process, case attributes can correspond to information needed to process bank loan applications, e.g., job title, annual salary, existing debt, and the like. On the other hand, when the case management system 200 manages an insurance claim process, case attributes can correspond to claim type, accident type, date of accident, time of accident, and the like.

In addition to standard attributes, the configuration information stored in the configuration repository 220 may also include performance criteria that define business goals and requirements, such as a service level agreement (SLA) and/or in key performance indicators (KPIs). Like case attributes and phases, performance criteria may be process specific depending on the type of process being managed. For example, a performance criterion for a bank loan application process can identify a maximum number of days in which a loan application must be completed. Similarly, a performance criterion for an insurance claim process can identify a time limit of a phone call for collecting information about a claimant.

In embodiments, the case management system 200 includes at least one work queue stored in the work queue repository 230. The work queue may include a plurality of tasks, i.e. task 1, task 2 . . . task N, associated with a plurality of cases stored in the case repository 210. The tasks in the work queue repository 230 may be assigned to a plurality of knowledge workers. The knowledge workers may be specifically trained to manage one or more types of tasks. For example, a work queue is associated with a contract review phase of a process and tasks in that work queue require knowledge of contract law. Such tasks may be assigned to knowledge workers with legal training and/or in the enterprise's legal department.

According to embodiments, a task manager component 235 in the case management system 200 is configured to manage task assignments. For example, when a task that needs to be completed is received and/or identified, the task manager component 235 is configured to identify which skill is needed to complete the task and to add the task to the work queue corresponding to the skill. In addition, when a request for a task is received from a knowledge worker, the task manager component 235 can be configured to determine the requesting knowledge worker's skill set based on, for example, the worker's role and/or department, to identify at least one work queue in the work queue repository 230 that matches the skill set, and to assign a task from the matching work queue to the requesting knowledge worker. In this manner, the task manager 235 may assign a plurality of tasks associated with a plurality of cases stored in the case repository 210 to the plurality of knowledge workers. In embodiment, the task manager component 235 maintains a task log that tracks which knowledge worker was assigned to perform which task. The task log may be operatively coupled to the task manager 235 and stored as part of the task manager component 235. Alternatively, the task log may be stored in the data store 105 and operatively coupled to the work queue repository 230.

In embodiments, a knowledge worker can receive an assigned task associated with a case from the task manager component 235. In many cases, the task may require the knowledge worker to make a decision based on case specific and/or non-case specific information. In the process of completing the task, the knowledge worker may use resources stored in the resource repository 240 to make a decision of the task. In embodiments, the knowledge worker can identify a resource, e.g. a document or a report, managed by the case management system 200 and can send a request for the resource to a computing device in the case management system 200. The case management system 200 may be configured to receive the request and route the request to the task manager component 235. The task manager component 235 may invoke a data manager component 245 to retrieve the requested resource from the resource repository 240 and to transmit the resource to the requesting knowledge worker.

Figure 3:
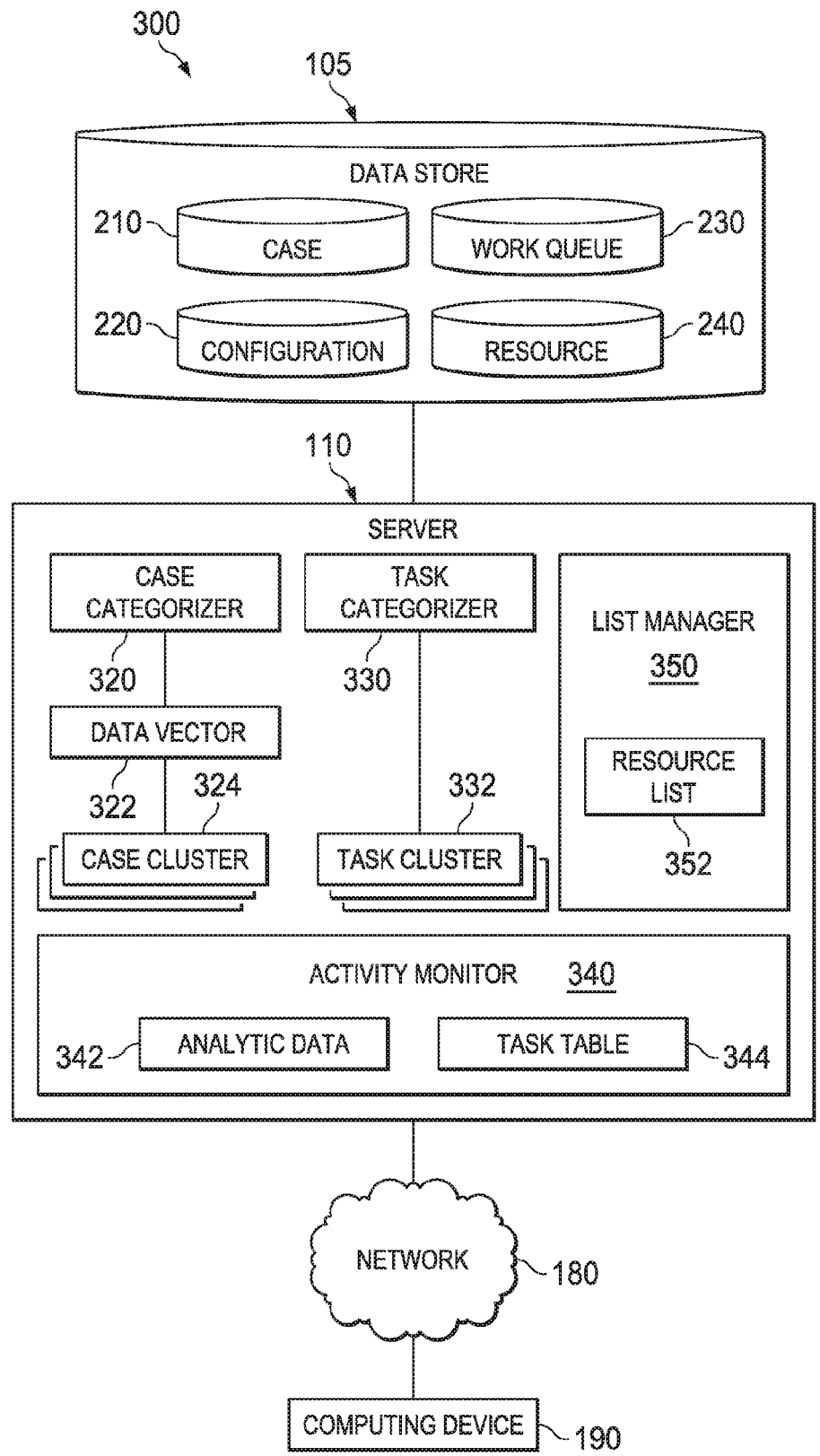
FIG. 3 is a diagram of an exemplary case management system providing information related to a task according to an exemplary embodiment.
Figure 4:
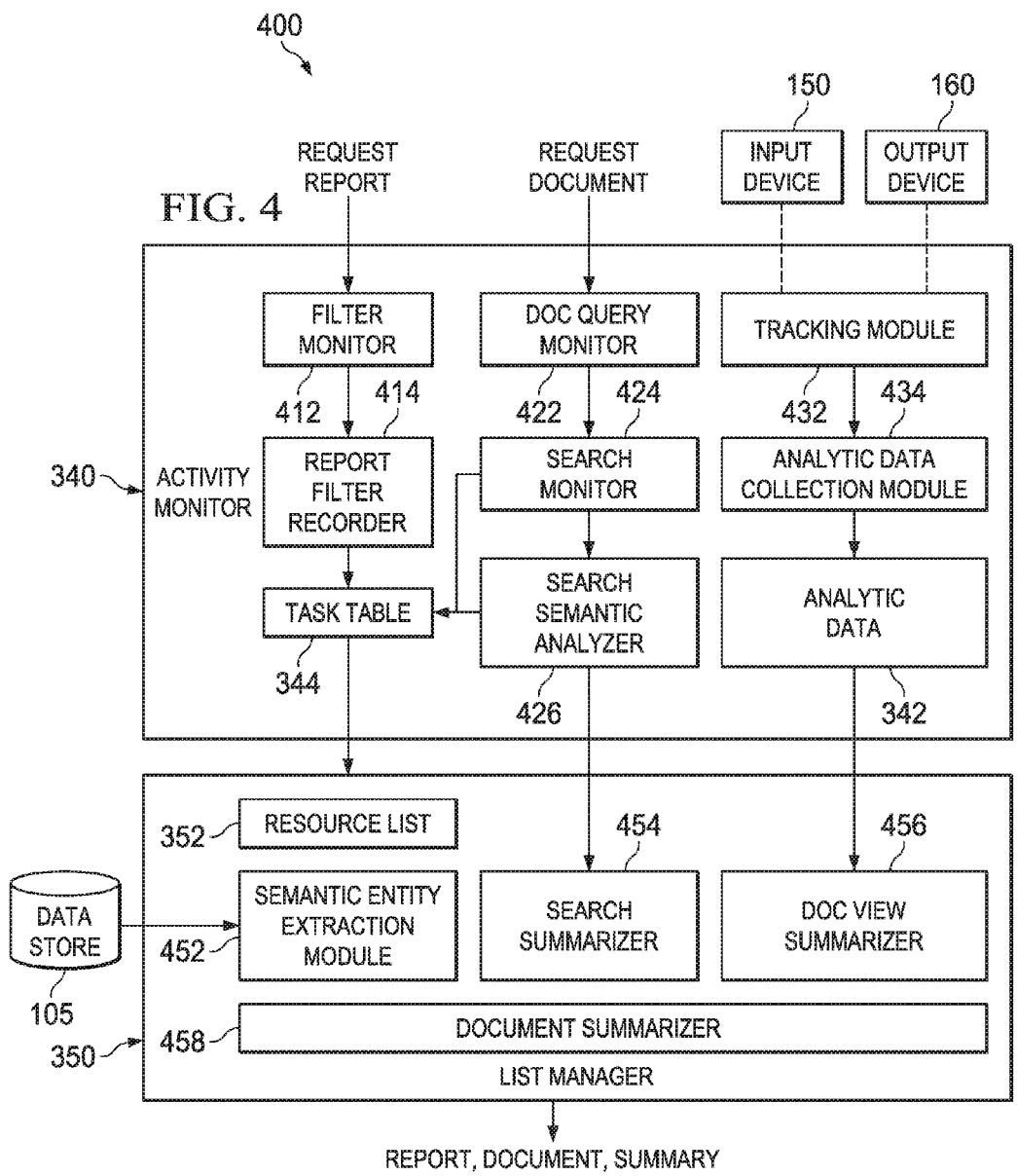
FIG. 4 is a diagram of an exemplary system illustrating the interaction between an activity monitor component and a list manager component to provide a summarized task view.

To help the knowledge worker identifying the resource used in the task, the case management system 200 may provide a summarized task view. An exemplary summarized task view user interface is illustrated in FIG. 4. Through the summarized task view, the knowledge worker may identify key resources, such as reports generated most by other knowledge workers when performing similar tasks. And through the summarized task view, the knowledge worker may have quick access to summaries of key resources, such as summaries of documents generated by the system 200 from documents used most by other knowledge workers when performing similar tasks. When the summarized task view is automatically provided along with the assigned task, the knowledge worker may spend less time searching for relevant information to complete the task, thereby shortening the cycle time for the task and improving overall process efficiency. FIG. 3 illustrates an exemplary system for generating the summarized task view based on reports and documents used to perform similar tasks.

FIG. 3 is a diagram of an exemplary case management system 300 for providing information related to a task. In order to generate the summarized task view, a computing device 110 may be used as a server to receive resource requests from a remote computing device 190 via network 180, manage and retrieve the data stored in the data store 105, and provide the data to the remote computing device 190 via the network 180.

The server 110 may include a case categorizer 320, a task categorizer 330 operatively coupled to the case categorizer 320, an activity monitor 340 operatively coupled to the case categorizer 320 and the task categorizer 330, and a list manager 350 operatively coupled to the activity monitor 340. Though FIG. 3 shown the server 110 as a separate component, the server 110 may be configured as a plurality of components and/or be included in other components, such as the task manager 235 and/or the data manager 245. Further, the server 110 may be configured as a plurality of components to interact with more than one case management system 300 in a distributed environment.

The case categorizer 320 may be configured to categorize the plurality of cases stored in the case repository 210 into a plurality of case clusters 324. Though not shown in FIG. 3, in embodiments, each case stored in the case repository 210 can include case metadata directed to geographical case specific parameters, such as a location or region where the case originated and/or a preferred language for communications. The case metadata may also be directed to contextual case specific parameters, such as a monetary value of the case, a customer, a product ordered, etc.

According to embodiments, the case categorizer 320 can be configured to collect the case metadata corresponding to the first plurality of cases stored in the case repository 210 and other case-related information, such as semantic entities extracted from case documents stored in the case repository 210 and/or the resource repository 240, and to create at least one data vector 322 for each of the first plurality of cases. The case categorizer 320 may then analyze the data vectors 322 to categorize the cases into the plurality of case clusters 324. Alternatively or in addition, the case categorizer 320 may be configured, in embodiments, to collect the case metadata corresponding to the plurality of cases stored in the case repository 210 and the other case-related information, and to apply a clustering algorithm to identify the plurality of case clusters 324. Though FIG. 3 shown the case cluster 324 being stored on the server 110, the case cluster 324 may be stored outside the server 110 in a separate repository or in other data storage, such as the data store 105.

According to embodiments, each case cluster 324 is associated with a case similarity factor shared by at least two cases of the plurality of cases, and each case of the plurality of cases is associated with a case cluster 324. The case categorizer 320 can be configured, in embodiments, to execute more than one clustering algorithm to generate different sets of case clusters 324 and then to compare and/or consolidate the sets to determine an optimal set of case clusters 324. Such a determination may be based on a minimum or maximum cluster size, the semantic value of the similarity factor associated with a cluster 324, and/or any other clustering parameter.

In embodiments, the case similarity factor of a case cluster 324 is shared by cases in the case cluster 324. Because the cases in the case cluster 324 are clustered based on the case metadata, the case similarity factors are naturally related to at least one of geographical case specific parameters, a preferred communication language, and contextual case specific parameters.

After each of the plurality of cases stored in the case repository 210 has been associated with a case cluster 324, a plurality of task clusters 332 may be identified for each of the plurality of case clusters 324. Tasks of the plurality of task clusters 332 may be performed on cases of the case cluster 324. Each task cluster 332 may be associated with a similarity factor shared by at least two tasks of the plurality of tasks stored in the work queue repository 230, and each task of the first plurality of tasks may be associated with a task cluster 332. According to embodiments, the server 110 can be configured to identify the plurality of task clusters 332 for each of the plurality of case clusters 324, where each task cluster is associated with a similarity factor shared by at least two tasks of the plurality of tasks stored in the work queue 230.

In embodiments, the categorization of tasks into the task clusters 332 may be performed by the task categorizer 330 in the server 110. The tasks stored in the work queue 230 may be categorized into task clusters 332 based on at least one similarity factor, which can be derived from a semantic analysis of information related to and/or relevant to each task. For example, the related and/or relevant information can include task metadata related to a task and/or case metadata associated with an underlying case for which the task is performed.

The task metadata related to the task can, in embodiments, be directed to task specific parameters that identify to which type of activity or function the task is directed, such as an investigation, a decision, a review or approval and/or a customer communication. The task metadata can also be directed to a type of expertise needed to perform the task, such as high level math skills, communication skills, and/or computer programming skills. As stated above, the case metadata associated with the first case can, in embodiments, be directed to geographical case specific parameters, such as a location or region where the case originated and/or a preferred language for communications. The case metadata may also be directed to contextual case specific parameters, such as a monetary value of the case, a customer, a product ordered, etc.

According to embodiments, the task categorizer 330 can be configured to collect the information related to and/or relevant to the plurality of tasks, e.g., the task metadata and case management data corresponding to each task, and to apply a clustering algorithm to the information related to and/or relevant to the plurality of tasks to identify the tasks clusters 332. In embodiments, the clustering algorithm can be selected from known clustering techniques such as, for example, K-means clustering, fuzzy clustering, and QT clustering. The task categorizer 330 may be configured, in embodiments, to execute more than one clustering algorithm to generate different sets of task clusters 332 and then to compare and/or consolidate the sets to determine an optimal set of task clusters 332. Such a determination may be based on a minimum or maximum cluster size, the semantic value of the similarity factor associated with a task cluster 332, and/or any other clustering parameter.

In embodiments, the task similarity factor of a task cluster 332 is shared by tasks in the task cluster 332. Because the tasks are clustered based on the task metadata and case metadata, the task similarity factors are naturally directed to at least task specific and case specific parameters, and/or preferred communication languages, and task expertise. Accordingly, in embodiments, the task similarity factor may be related to at least one of geographical case specific parameters, a preferred communication language, contextual case specific parameters, task specific parameters, and a type of expertise associated with the task.

In embodiments, each task of the plurality of tasks stored in the work queue 230 is included in a task cluster 332. For example, a task cluster associated with a task similarity factor identifying loans originating in a particular city, e.g., San Francisco, includes tasks that are associated with a loan originating in San Francisco, and does not include a loan originating in Los Angeles. In another example, another task cluster is associated with a task similarity factor identifying loans exceeding a threshold value, and each task in the cluster is associated with a loan exceeding the threshold value. In embodiments, the task similarity factor of a task cluster 332 can be multifaceted in that it can encompass more than one clustering condition. For example, a task cluster can be associated with a multifaceted similarity factor identifying loans originating in San Francisco and exceeding the threshold value. In embodiments, the task categorizer 330 can be configured to adjust and modify the task similarity factors of the task clusters 332 such that each task of the plurality of tasks stored in the work queue 230 is included in one task cluster 332.

According to embodiments, the activity monitor component 340 can be configured to watch the case management system 300 and to monitor the activities of the knowledge workers using the case management system 300 as the assigned tasks are being completed. In embodiments, when a request for a resource used in a task is received and processed by the case management system 300, the activity monitor component 340 can be configured to detect the activity associated with the task. In response, the activity monitor component 340 may be configured to correlate the requested resource with the task and to store the correlation in a task table 344. For example, when the requested resource is received from the data manager 245, a resource identifier associated with the resource can be generated or detected, and stored in a task table 344 that correlates the task with the resource. The activity monitor component 340 may be configured to store the resource identifiers associated with the requested resources for at least each task of the plurality of tasks stored in the work queue 230 in the task table 344.

In addition to determining the resources used for each of the first plurality of tasks, the activity monitor component 340 may also generate analytic data 342 based on the activities of the knowledge workers as the assigned tasks are being completed. The activities may include the search inquiries of documents, the time spent viewing and analyzing a part of a document, the viewing location in a document, semantic entities in a selected document, filter criteria to generate reports, combination and/or comparisons of the activities, among others.

Once the resources used for each of the plurality of tasks have been determined and analytic data 342 have been generated to associate the knowledge worker activities of using the resources to complete the plurality of tasks, a resource list 352 may be generated by the list manager component 350 for each task cluster 332. In embodiments, the resource list 352 identifies at least one resource used by at least one knowledge worker to complete the at least two tasks associated with the task cluster 332. The resource list 352 may comprise resources, such as reports and documents, used by the knowledge worker to complete tasks associated with the task cluster 332. In addition, the list manager component 350 may generate document summaries and store the document summaries in the resource list 352. The interaction between the activity monitor 340 and the list manager 350 to generate the summarized task view is further illustrated in FIG. 4.

FIG. 4 is a diagram of an exemplary system 400 illustrating the interaction between the activity monitor 340 and the list manager 350 to provide a summarized task view. The case management system 400 may include the activity monitor component 340 and the list manager 350. As shown in FIG. 3, the activity monitor 340 may include the analytic data 342 and the task table 344. In addition, the activity monitory 340 may include a filter monitor 412 operatively coupled to a report filter recorder 414 to record the report-filter criterion-task association in the task table 344, a search monitor 424 operatively coupled to a document query monitor 422 and a search semantic analyzer 426 to monitor search for documents, a tracking module 432 operatively coupled to an analytic data collection module 434 to track input device(s) 150 and output device(s) 160 and generate the analytic data 342 based on the tracking. Also as shown in FIG. 3, the list manager 350 may include a resource list 352 for each task cluster that includes at least some of the resources used by knowledge workers to complete the tasks associated with the task cluster. In addition, the list manager 350 may include a semantic entity extraction module 452 operatively coupled to the data store 105 to extract semantic entities, a search summarizer 454 operatively coupled to the search semantic analyzer 426 to generate document summaries based on document searches conducted by knowledge workers when performing similar tasks, a document view summarizer 456 operatively coupled to the analytic data to generate document summaries, and a document summarizer 458.

When a knowledge worker is assigned a task in an underlying case, the knowledge worker may request resource(s), such as documents and reports, from the resource repository 240. In embodiments, the request can be for specific content in the resource repository 240. Accordingly, the request can include a filter criterion that identifies the content in the resource in an embodiment. For example, the knowledge worker can be assigned to complete a task for an insurance claim case that originated in South Boston. In order to understand the case, the knowledge worker may transmit a request for a resource, e.g., a report detailing crime rate trends over a previous month, including the filter criterion, "Case Origin=South Boston." When the request is received, the task manager component 235 may invoke the data manager 245 to retrieve the requested resource, e.g., the report, from the resource repository 240 and to apply the filter criterion to the retrieved resource. The requested content of the resource may then be transmitted to the requesting knowledge worker. In response to this activity, the activity monitor component 340 may be configured to correlate the requested resource and the filter criterion with the task and to store the correlation in the task table 344.

During the report request and response process, the filter monitor component 412 in the activity monitor 340 may monitor each filter criterion used to generate the report. And over time, the filter monitor component 412 in the activity monitor 340 may monitor each filter criterion used to generate the reports when performing similar tasks in the task cluster. Upon detecting the filter criteria and the reports requested, the report filter recorder 414 may associate the filter criterion and the report with the task and store the correlation in the task table 344.

Once the activity monitor component 340 has recorded the correlation in the task table 344, the list manager component 350 may be configured to generate the resource list 352 for a task cluster by determining which of the plurality of resources were used to complete the tasks in the task cluster. For example, the list manager component 350 can receive from the task categorizer 330 a task cluster that includes a first task and a second task, and can, for the first task, determine which resource(s) were used to complete the first task, for example, by referring to the task table 344 managed by the activity monitor component 340. In a similar manner, the list manager 350 may determine the resources used to complete the second task in the task cluster. Each of the determined resources may then identified, e.g., by their respective resource identifiers, in the resource list 352 for the task cluster. In embodiments, when a resource is correlated with additional information, such as a filter criterion applied to the resource recorded by the report filter recorder 414, the resource list 352 for the task cluster 332 may identify both the resource and the additional correlated information, e.g., the filter criterion. The reports along with the correlated additional information, such as the filter criteria stored in resource list 352 may then be presented in a summarized task view in a similar task.

In embodiments, the request from the knowledge worker can include a search query for resources that satisfy the query. For example, when the knowledge worker is completing a task for an insurance claim from South Boston, the knowledge worker can send a request for resources that includes a search query for documents related to South Boston. In this case, the case management system may be configured to identify a plurality of resources satisfying the search query, and may return a search result identifying links to the plurality of resources. When the search result is received by the knowledge worker, the knowledge worker may select a resource and send an indication to access the resource to the case management system. When received, the case management system can be configured to retrieve and return the selected resource to the knowledge worker.

In response to this activity, the document query monitor 422 in the activity monitor component may be configured to monitor a search query and the documents satisfying the search query, the search monitor 424 may detect a request to access a selected document of the documents and correlate the selected document with the task and to store the correlation in the task table 344. In addition, the search semantic analyzer 426 can be configured, in an embodiment, to determine why the selected resource is relevant to the task. According to embodiments, the search semantic analyzer 426 can be configured to compare semantic entities in the selected resource with the search query and with the case metadata of the case with which the task is associated to determine why the identified resource is relevant to the task.

For example, when the task is for the insurance claim from South Boston, the selected document may have the name of the claimant or the name of an automobile repair shop, both of which are likely found in the case metadata. This determination of relevancy may also be stored in the task table 344 along with the selected resource and the task.

In embodiments, the search monitor 424 may also detect a keyword search conducted inside the selected document. Upon detecting the keyword search, the search semantic analyzer 426 may compare semantic entities in the selected resource with the keyword and with the case metadata of the case with which the task is associated to determine what keywords the knowledge worker was looking for inside the document, and why the keywords are relevant to the task. This determination of relevancy may also be stored in the task table 344 along with the keywords, the selected resource, and the task. According to embodiments, once the relevancy is determined based on the comparison result, the search summarizer 454 in the list manager 350 can generate resource summaries based on the semantic entities and the comparison result. The resource summaries generated by the search summarizer 454 may then be stored in the resource list 352 for a task cluster along with the selected resource. And the resource summaries may be presented in a summarized task view of a similar task in the task cluster.

According to embodiments, the activity monitor component 340 can determine for each of the plurality of tasks, which resources, e.g., reports and documents, the knowledge workers viewed and read to complete the tasks. For example, when the requested resources, such as documents, are viewed on an output device, the tracking module 432 in the activity monitor component 340 can be configured to receive an output signal from the output device 160 and an input signal from the input device 150 indicative of a view location and a view time in the documents. The view location and the view time tracking by the tracking module 432 may be used by the analytic data collection module 434 to generate the analytic data 342 indicating the viewing pattern of knowledge workers when performing similar tasks, such as which part of a document the knowledge workers spent most time etc. In addition, the analytic data collection module 434 may be configured to determine why the knowledge workers were interested in this information based on similarities between case metadata and semantic entities extracted from the resources. Having generated the analytic data 342, the document view summarizer 456 in the list manager 350 may generate resource summaries based on the analytic data, such as generating a summary of a document based on the analytic data indicating knowledge workers spent most time viewing a part of the document. The resource summaries generated by the document view summarizer 456 may be stored in the resource list 352 for a task cluster. And the resource summaries may then be presented in a summarized task view of a similar task in the task cluster.

In addition to the search summarizer 454 and the document view summarizer 456, summaries of resources may also be extracted from resources by the semantic entity extraction module 452. The semantic entity extraction module 452 may extract semantic entities from resources stored in the data store 105, such as documents. The extract semantic entities may then be stored in the resource list 352 and presented in a summarized task view as summaries of resources in a similar task.

The resource summaries generated by the semantic entity extraction module 452, the search summarizer 454, and the document view summarizer 456 may be further processed by the document summarizer 458 to improve the accuracy of the summaries. In embodiments, the document summarizer 458 may apply document summarization algorithms known in the art to the resource summaries stored in the resource list 352. Examples of the document summarization algorithm include the event indexing and summarization (EIS) algorithm (Yi Guo and George Stylios, An Intelligent Algorithm for Automatic Document Summarization, Heriot-Watt University, which is incorporated by reference herein in its entirety). Other document summarization algorithms may also be used in place of and/or in conjunction with the EIS algorithm. In embodiments, instead of applying the document summarization algorithms to the resource summaries stored in the resource list 352, the document summarizer 458 may apply the document summarization algorithms directly to the resources stored in the data store 105 to generate resource summaries. The resource summaries generated by the document summarizer 458 may be stored in the resource list 352 for a task cluster. And the resource summaries generated by the document summarizer 458 may be presented in a summarized task view of a similar task the task cluster.

Figure 5:
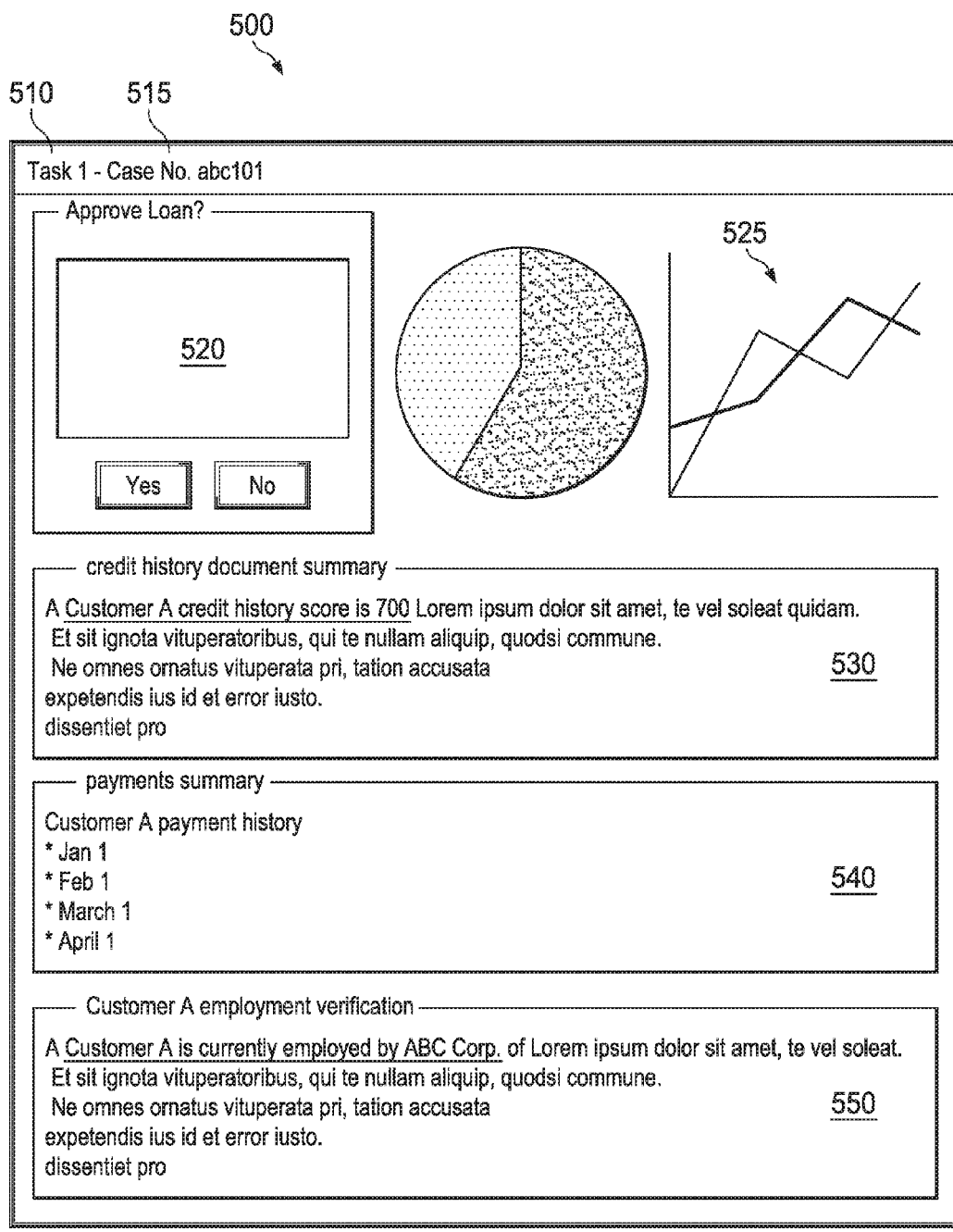
FIG. 5 is an exemplary user interface illustrating a summarized task view according to an exemplary embodiment.

FIG. 5 is an exemplary user interface 500 presenting a summarized task view according to an exemplary embodiment. When a task is assigned to a knowledge worker by the task manager 235, the summarized task view 500 may be presented to the knowledge worker as suggested reports and summaries of documents that can be used to complete the task. The user interface 500 may include a task identifier 510 identifying the task the knowledge worker is assigned, a case identifier 515 identifying the underlying case the task is associated with, a task pane 520 to accept the knowledge worker input to the task, e.g., yes or no to a loan approval and notes etc., at least one report 525, and at least one document summary 530.

The at least one report 525 along with correlated additional information, such as filter criteria applied to the at least one report 525 may be retrieved from the resource list 352. Though FIG. 5 shown two reports in the exemplary user interface 500, the number of reports displayed may not be limited. Depending on the task configuration, in embodiments, a threshold can be applied to display most commonly used reports stored in the resource list 352.

In addition to reports, a plurality of document summaries may be displayed in the summarized task view 500. Similar to the report display, the number of document summaries displayed may be limited or unlimited, depending on the task configuration. In a document summary 530, summaries may be provided, and links may be attached to the summaries so that the knowledge worker may follow the link to the corresponding resources.

For example, as shown in FIG. 5, in a payment history document summary, a list of months representing available monthly payments are displayed as document summaries, and links 540 to the monthly payments documents may be attached to the list of months, so that when the knowledge clicks on a link, the monthly payment document for the assigned task in the case may be displayed. And as shown in FIG. 5, in another example, in a customer employment verification document summary view, a link 550 may be attached to the summary of a prior employment. Following the link 550, the knowledge worker may view the resource, such as an employment verification document from the prior employment.

The summaries in each document summary view may be generated by the components in the list manager as shown in FIG. 4 based on activities performed by knowledge workers in similar tasks. Accordingly, when a knowledge worker is assigned to perform the task, he or she has immediate access to searches and queries used by other knowledge workers in performing similar cases and tasks. And the resource summaries may help the knowledge worker to identify key information for completing the task. Further, by following the links provides in the resource summaries, the knowledge worker may have access to resources used by other knowledge workers to complete similar tasks. The generation of the summarized task view 500 and the use of the summarized task view 500 in a case management system are further illustrated in FIG. 6.

Figure 6:
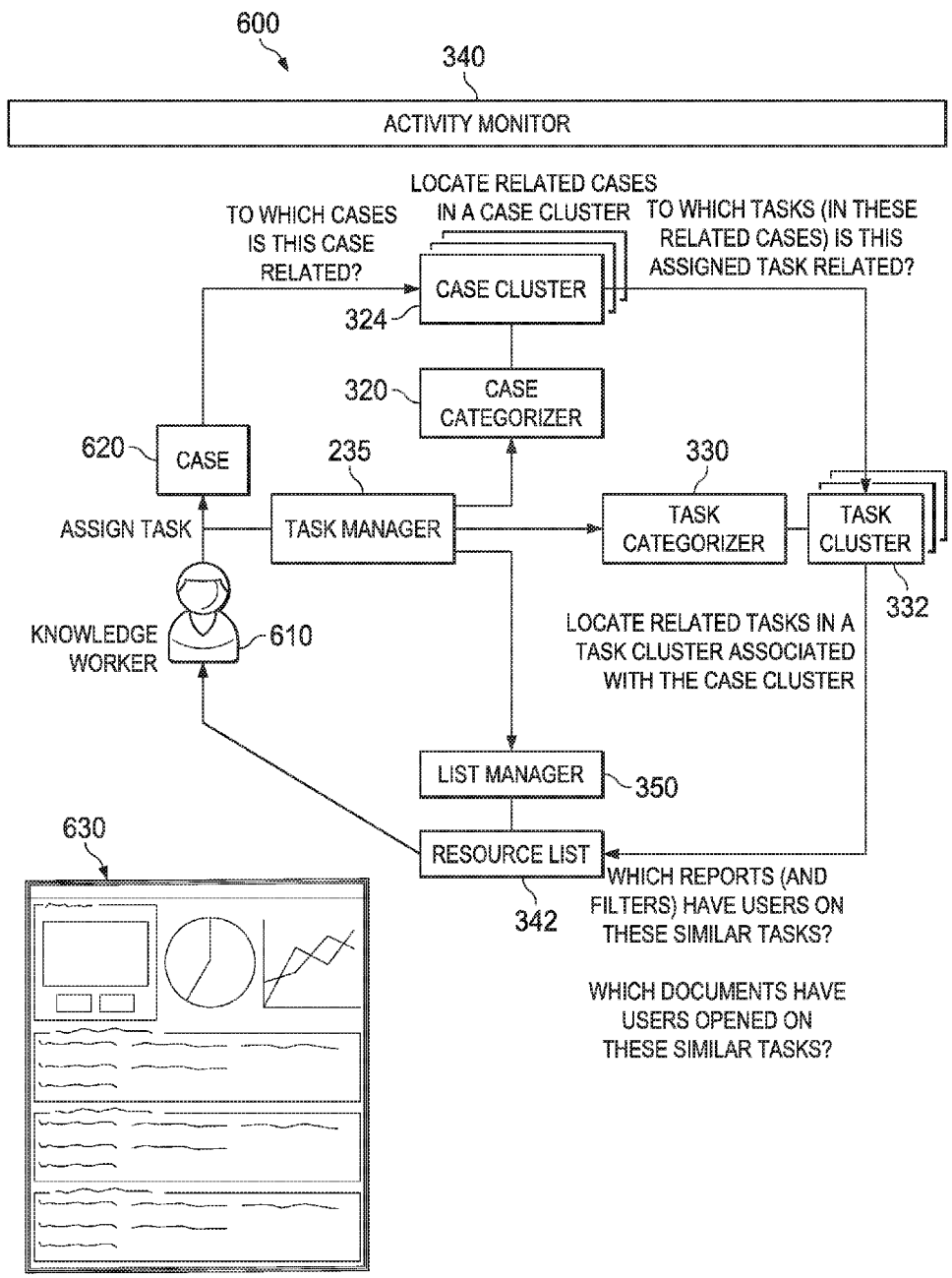
FIG. 6 is a diagram of an exemplary case management system illustrating generating and using a summarized task view to perform a task in the case management system according to an exemplary embodiment.

FIG. 6 is a diagram of an exemplary case management system 600 for generating and using a summarized task view to perform a task according to an exemplary embodiment. In the case management system 600, when a knowledge worker 610 is assigned to work on a task in a case 620 via the task manager component 235, the task manager component 235 may invoke the case categorizer 320 and/or the task categorizer 330 to retrieve the case cluster 324 associated with the task's underlying case 620 and/or the tasks' task cluster 332 respectively.

The case categorizer 320 may look through the case cluster 324, determine to which cases the underlying case 620 is related, and locate related cases in the case cluster 324. The underlying case 620 may share a case similarity factor with at least another case in the case cluster 324. Such cases sharing the case similarity factor may be located by the case categorizer 320, and in embodiments, the case categorizer 320 can generate a case list identifying the cases in the case cluster 324 sharing the case similarity factor. According to embodiments, the case similarity factor may be related to at least one of geographical case specific parameters and contextual case specific parameters.

Similar allocation of the task cluster 332 may be performed by the task categorizer component 330 to look through the task cluster 332, determine to which tasks in these related cases the assigned task is related, and locate related tasks in the task cluster 332 associated with the cases in the case cluster 324 sharing the case similarity factor. The assigned task may share a task similarity factor with at least another task in the task cluster 332. Such tasks sharing the task similarity factor may be located by the task categorizer 330, and in embodiments, the task categorizer 330 can generate a task list identifying the tasks in the task cluster 332 sharing the task similarity factor. According to embodiments, the task similarity factor may be is related to the case similarity factor and task specific parameters.

In embodiments, the task manager component 235 may invoke the list manager component 350 to retrieve the resource list 352 for the task cluster 332 with which the assigned task is associated and in which the assigned task is included. The list manager component 350 may locate the resource list 352 based on determinations, such as which reports and filters users have used on performing similar tasks, and/or which documents users have opened on similar tasks. Once the resources used to perform similar tasks in similar cases have been identified, the resources, such as reports and document summaries, may be generated and provided in a summarized task view 630 to the knowledge worker 610.

An exemplary summarized task view 630 user interface is illustrated in FIG. 5. The summarized task view 630 may be generated by components in the list manager 350 as shown in FIG. 4. Upon viewing the reports and the document summaries, the knowledge worker may request resources by following the links provided in the summarized task view 630. According to embodiments, when the requested resource(s) are requested, retrieved and returned, the activity monitor component 340, while continuously monitoring the system 600, can be configured to update the task table 344 to indicate that the requested resource(s) were used to complete the task.

In embodiments, when the task table 344 is updated, the list manager component 350 can also be invoked to update the resource list 352 for the task cluster with which the task is associated. For example, when the requested resource is in the resource list 352, the list manager 350 can be configured, in an embodiment, to update the cluster rating of each resource 328 identified in the resource list 352 and to reorder the resources in the resource list 352 based on the updated cluster ratings. According to embodiments, an existing resource in the resource list 352 can be removed from the resource list 352 when the resource's updated cluster rating is below a minimum threshold value. Alternatively, when the requested resource 328b is a new resource not included in the resource list 352, the list manager 350 can be configured, in another embodiment, to add information identifying the new resource to the resource list 352. Based on the resource list 352, the summarized task view 630 may be updated to reflect the updated cluster rating meeting the minimum threshold value.

In addition or alternatively, the case categorizer component 320, task categorizer component 330 and list manager component 350 in the server 110 may be configured to categorize case, tasks, and update the resource list 352 periodically to ensure that the case clusters 324, the task clusters 332 and the resource lists 342 are representative of current task characteristics and utilized resources respectively. For example, the task categorizer 330 can be configured to collect the most recent information related to and/or relevant to a most recent plurality of completed tasks, e.g., the task metadata and case metadata corresponding to each task, and to apply the clustering algorithm to the most recent information related to and/or relevant to the most recent plurality of completed tasks to identify new and/or updated tasks clusters 332. The list manager component 350 may then generate new and/or updated resource lists 342 for each new and/or updated task cluster 332. Thus, the case clusters 324, the task clusters 332 and the resources in the resource lists 342 may be dynamic; trends in the case metadata and the emergence of new resources may be detected and captured; and the dynamic information may be reflected in the summarized task view 630 to assist the knowledge worker identifying key information for completing the assigned task.

Figure 7:
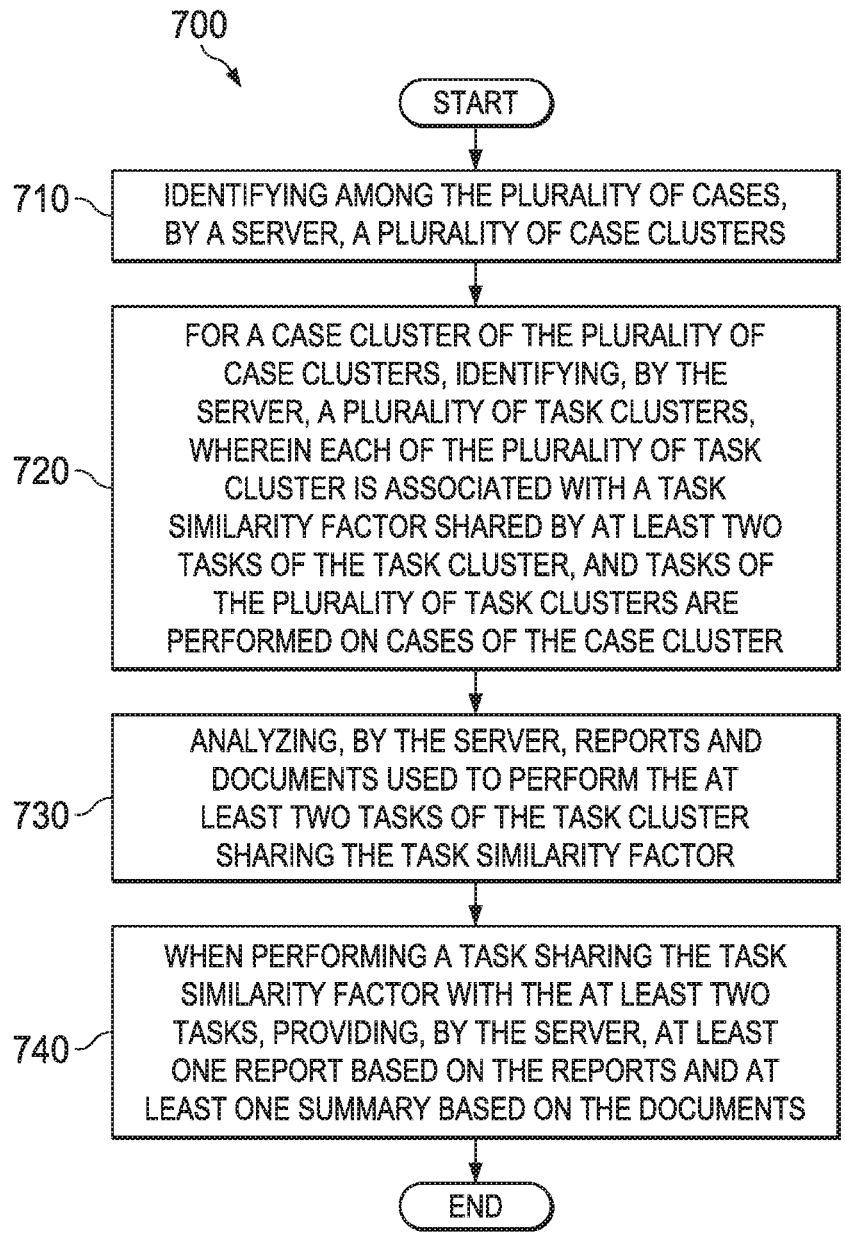
FIG. 7 is a diagram of an example computer implemented method executed to provide a summarized task view in a case management system according to an exemplary embodiment.

FIG. 7 is a diagram of a computer implemented method 700, according to embodiments, to provide a summarized task view in a case management system. The computer implemented method 700 may be carried out by, for example, at least some of the components in the exemplary arrangement of components illustrated in FIG. 3 and FIG. 4. The arrangement of components in FIG. 3 and FIG. 4 may be implemented by the components of the computing environment 100 of FIG. 1. The case management process may start by executing an operation 710 by the case categorizer 320 residing on the server 110 to identify among the plurality of cases of the case management system 300, a plurality of case clusters 324. Each case cluster 324 may be associated with a case similarity factor shared by at least two cases of the case cluster 324. In embodiments, the server 110 can be included in the task manager component 235 in the case management system 300, and can have access to the data store 105 via the data manager 245. In another embodiment, the server 110 can be provided outside of the case management system 300 as a separate component and configured to interact with more than one case management system 300 in a distributed environment.

Upon categorizing the plurality of cases into the plurality of case clusters 324, an operation 720 may be executed by the task categorizer 330 residing on the server 110 to identify, for a case cluster of the plurality of case clusters 324, a plurality of task clusters 332. Each of the plurality of task cluster 332 may be associated with a task similarity factor shared by at least two tasks of the task cluster, and tasks of the plurality of task clusters are performed on cases of the case cluster. The task similarity factor may be derived from a semantic analysis of information related to and/or relevant to each task. For example, the related and/or relevant information can include task metadata related to a task and/or case metadata associated with an underlying case for which the task is performed.

Having categorized the cases and the tasks, an operation 730 is executed by the activity monitor 340 residing on the server 110 to analyze resources, such as reports and documents, used to perform the at least two tasks of the task cluster sharing the task similarity factor. The activity monitor 340 may monitor the knowledge worker's activities and resources used by the knowledge worker to complete the tasks. In addition, the activity monitor 340 may collect analytic data 342 from monitoring the activities and the resources. Based on the analytic data 342 collected and the analysis by the activity monitor 340, an operation 740 is executed by the list manager 350 residing on the server 110 to provide at least one report based on the reports generated by knowledge workers when performing similar tasks and at least one summary based on the documents used by the knowledge worker when performing similar tasks. The similar tasks and the task assigned to the knowledge worker share the task similarity factor in a task cluster. An exemplary summarized task view user interface is illustrated in FIG. 5.

For the sake of clarity, the processes and methods herein have been illustrated with a specific flow, but it should be understood that other sequences may be possible and that some may be performed in parallel, without departing from the spirit of the system and method. Additionally, steps may be subdivided or combined.

All references cited herein are intended to be incorporated by reference. Although the present system and method has been described above in terms of specific embodiments, it is anticipated that alterations and modifications to this system and method will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the system and method is not to be limited to the details given herein. It is therefore intended that the disclosure and following claims be interpreted as covering all such altera-

What is claimed is:

1. A computer implemented method for providing information related to a task in a case management system configured to process a plurality of cases, the computer implemented method comprising:
   monitoring, by a server, requests for resources used to perform a plurality of tasks and storing correlations between the requested resources and tasks from the plurality of tasks;
   clustering the plurality of cases, by the server, into a plurality of case clusters, wherein each of the plurality of case clusters is associated with a case similarity factor shared by at least two cases of the plurality of cases;
   for a case cluster of the plurality of case clusters, identifying, by the server, a plurality of task clusters, wherein each of the plurality of task clusters is associated with a task similarity factor shared by at least two tasks of the task cluster, and tasks of the plurality of task clusters are performed on cases of the case cluster;
   analyzing, by the server, reports and documents used to perform the at least two tasks of the task cluster sharing the task similarity factor;
   associating, by the server, the reports and documents used to perform the at least two tasks of the task cluster sharing the task similarity factor with the task cluster associated with the task similarity factor; and
   when performing a task sharing the task similarity factor with the at least two tasks of the task cluster sharing the task similarity factor, providing, by the server, to a remote computer, at least one report based on the reports associated with the task cluster and at least one summary based on the documents associated with the task cluster.

2. The method of claim 1, further comprising: prior to performing a new task on an underlying case,
   determining, by the server, with which case cluster the underlying case is associated and identifying with which task cluster of the determined case cluster the new task is associated;
   including, by the server, the new task in the identified task cluster; and
   providing, by the server, the at least one report and the at least one summary to facilitate performing the new task.

3. The method of claim 1, wherein analyzing, by the server, the reports and the documents used to perform the at least two tasks of the task cluster sharing the task similarity factor includes:
   monitoring, by the server, a filter criterion to generate the reports; and
   associating, by the server, the fitter criterion and the reports with the at least two tasks.

4. The method of claim 1, wherein analyzing, by the server, the reports and documents used to perform the at least two tasks of the task cluster sharing the task similarity factor includes:
   monitoring, by the server, when the documents satisfying a search query included in a request for the documents is identified;
   detecting, by the server, a request to access a selected document of the documents; and
   comparing semantic entities in the selected document with the search query and with case metadata of the case with which the task is associated to determine why the selected document is relevant to the task.

5. The method of claim 4, wherein the at least one summary is generated based on the semantic entities and a result of the comparing the semantic entities in the selected document with the search query and with case metadata.

6. The method of claim 1, wherein the at least one summary is generated based on searches conducted inside the documents when performing the task, and the searches include keyword searches of the documents.

7. The method of claim 1, wherein the at least one summary is generated based on analytic data collected when the documents are viewed to perform the task, and the analytic data collection includes input device tracking and output device tracking when the documents are viewed.

8. The method of claim 1, wherein the at least one summary is generated by applying a document summarization algorithm to searches conducted inside the documents, a tracking of document review, and semantic entities extracted from the documents.

9. The method of claim 1, wherein the case similarity factor is related to at least one of geographical case specific parameters and contextual case specific parameters.

10. The method of claim 9, wherein identifying among the plurality of cases, by the server, the plurality of case clusters includes:
    extracting semantic entities from the plurality of cases;
    creating at least one data vector based at least on case metadata and the semantic entities of each of the plurality of cases; and
    using the at least one data vector to categorize the plurality of cases into the plurality of case clusters based on the case similarity factor.

11. The method of claim 9, wherein for the case cluster of the plurality of case clusters, identifying, by the server, the plurality of task clusters includes:
    based on the task similarity factor, using task metadata, case metadata, and semantic entities to categorize the tasks into the plurality of task clusters, wherein the semantic entities are extracted from case documents used in performing the tasks, wherein the task similarity factor is related to the case similarity factor and task specific parameters.

12. A system for providing information related to a task in a case management system configured to process a plurality of cases, the system comprising:
    a case categorizer, residing on a server, to identify among the plurality of cases a plurality of case clusters, wherein each of the plurality of case clusters is associated with a case similarity factor shared by at least two cases of the plurality of cases;
    a task categorizer, operatively coupled to the case categorizer, for a case cluster of the plurality of case clusters, to identifying a plurality of task clusters, wherein each of the plurality of task cluster is associated with a task similarity factor shared by at least two tasks of the task cluster, and tasks of the plurality of task clusters are performed on cases of the case cluster;
    an activity monitor, operatively coupled to the case categorizer and the task categorizer, to monitor requests for resources used to perform a plurality of tasks and store correlations between the requested resources and tasks from the plurality of tasks, and to analyze reports and documents used to perform the at least two tasks of the task cluster sharing the task similarity factor and collect analytic data based on an analysis of the reports and documents; and a list manager, operatively coupled to the activity monitor, to associate the reports and documents used to perform the at least two tasks of the task cluster sharing the task similarity factor with the task cluster associated with the task similarity factor, and when the server executes a task sharing the task similarity factor with the at least two tasks of the task cluster sharing the task similarity factor, to provide to a remote computer at least one report based on the reports associated with the task cluster and at least one summary based on the documents associated with the task cluster.

13. The system of claim 12, wherein the activity monitor includes:
a filter monitor to monitor a filter criterion to generate a report in the reports when performing a task in the task cluster; and
a report filter recorder to associate the filter criterion and the report with the task.

14. The system of claim 12, wherein the activity monitor includes:
a document query monitor to monitor a search query and the documents satisfying the search query;
a search monitor to detect a request to access a selected document of the documents and detect keywords searched inside the selected documents; and
a search semantic analyzer to compare semantic entities in the selected document with the search query, the keyword, and with case metadata of the case with which the task is associated to determine why the selected document and the keywords are relevant to the task.

15. The system of claim 14, wherein the list manager includes: a search summarizer to generate the at least one summary based on the semantic entities and a result of a comparison among semantic entities in the selected document with the search query, the keyword and the case metadata of the case.

16. The system of claim 12, wherein the activity monitor includes:
a tracking module, when the documents are viewed on an output device, to receive an output signal from the output device and an input signal from an input device indicative of a view location and a view time in the documents; and
an analytic data collection module to generate analytic data based on the view location and the view time in the documents, wherein the analytic data indicates which parts of the documents are viewed the most.

17. The system of claim 16, wherein the list manager includes:
a document view summarizer to generate the at least one summary based on the analytic data when executing the task.

18. The system of claim 12, wherein the list manager includes:
a semantic entity extraction module to generate the at least one summary based on semantic entities extracted from the documents.

19. The system of claim 12, wherein the list manager includes:
a document summarizer to generate the at least one summary by applying a document summarization algorithm to searches conducted inside the documents, a document tracking, and semantic entities extracted from the documents.

20. A machine-readable medium including instructions embodied in a tangible, non-transitory, computer readable storage medium and comprising computer instructions executable by a processor to perform a computer implemented method for providing information related to a task in a case management system configured to process a plurality of cases, the computer implemented method comprising:
monitoring, by a server, requests for resources used to perform a plurality of tasks and storing correlations between the requested resources and tasks from the plurality of tasks;
clustering, by the server, a plurality of cases into a plurality of case clusters, wherein each of the plurality of case clusters is associated with a case similarity factor shared by at least two cases of the plurality of cases;
for a case cluster of the plurality of case clusters, identifying, by the server, a plurality of task clusters, wherein each of the plurality of task clusters is associated with a task similarity factor shared by at least two tasks of the task cluster, and tasks of the plurality of task clusters are performed on cases of the case cluster;
analyzing, by the server, reports and documents used to perform the at least two tasks of the task cluster sharing the task similarity factor;
associating, by the server, the reports and documents used to perform the at least two tasks of the task cluster sharing the task similarity factor with the task cluster associated with the task similarity factor; and
when performing a task sharing the task similarity factor with the at least two tasks of the task cluster sharing the task similarity factor, providing, by the server, to a remote computer, at least one report based on the reports associated with the task cluster and at least one summary based on the documents associated with the task cluster.

* * * * *